United States Patent
Shirahama et al.

(10) Patent No.: US 6,999,129 B2
(45) Date of Patent: Feb. 14, 2006

(54) IMAGE PROCESSING APPARATUS, METHOD, AND RECORDING MEDIUM FOR CONTROLLING IMAGE QUALITY

(75) Inventors: Akira Shirahama, Kanagawa (JP); Shinichiro Miyazaki, Kanagawa (JP); Hitoshi Nakamura, Tokyo (JP)

(73) Assignee: Sony Corporation (JP)

(*) Notice: Subject to any disclaimer, the term of this patent is extended or adjusted under 35 U.S.C. 154(b) by 417 days.

(21) Appl. No.: 09/855,345

(22) Filed: May 15, 2001

(65) Prior Publication Data

US 2002/0071493 A1 Jun. 13, 2002

(30) Foreign Application Priority Data

May 17, 2000 (JP) .................................... P2000-144410

(51) Int. Cl.
H04N 5/44 (2006.01)
H04N 7/00 (2006.01)
H04N 7/08 (2006.01)
H04N 11/00 (2006.01)

(52) U.S. Cl. ........................ 348/553; 348/473; 348/474; 348/725; 348/460; 348/461

(58) Field of Classification Search ......... 348/553–554, 348/473–474, 725–726, 460–461, 465, 468; 725/37; 375/240.26; 345/133, 611; H04N 5/44, H04N 7/00, 7/08, 11/00
See application file for complete search history.

(56) References Cited

U.S. PATENT DOCUMENTS

| | | | | |
|---|---|---|---|---|
| 5,541,662 A | * | 7/1996 | Adams et al. | 348/460 |
| 5,600,378 A | * | 2/1997 | Wasilewski | 348/468 |
| 5,844,478 A | * | 12/1998 | Blatter et al. | 348/474 |
| 5,856,973 A | * | 1/1999 | Thompson | 370/389 |
| 6,064,378 A | * | 5/2000 | Chaney et al. | 725/39 |
| 6,137,539 A | * | 10/2000 | Lownes et al. | 348/569 |
| 6,151,078 A | * | 11/2000 | Yoneda et al. | 348/558 |
| 6,157,396 A | * | 12/2000 | Margulis et al. | 345/506 |
| 6,157,673 A | * | 12/2000 | Cuccia | 375/240 |
| 6,172,719 B1 | * | 1/2001 | Kim | 348/655 |
| 6,188,439 B1 | * | 2/2001 | Kim | 348/553 |
| 6,271,893 B1 | * | 8/2001 | Kawaguchi et al. | 348/725 |
| 6,292,226 B1 | * | 9/2001 | Yamanaka et al. | 348/556 |
| 6,320,623 B1 | * | 11/2001 | Cavallerano et al. | 348/553 |
| 6,340,994 B1 | * | 1/2002 | Margulis et al. | 348/625 |
| 6,373,904 B1 | * | 4/2002 | Sakamoto et al. | 375/316 |
| 6,411,335 B1 | * | 6/2002 | Jang | 348/553 |
| 6,414,954 B1 | * | 7/2002 | Miyamoto | 370/389 |
| 6,490,728 B1 | * | 12/2002 | Kitazato et al. | 725/151 |
| 6,493,043 B1 | * | 12/2002 | Bollmann et al. | 348/714 |
| 6,501,510 B1 | * | 12/2002 | Moon | 348/553 |
| 6,580,462 B2 | * | 6/2003 | Inoue et al. | 348/460 |
| 6,588,014 B1 | * | 7/2003 | Hayashi | 725/54 |
| 6,609,251 B1 | * | 8/2003 | Yoneda | 725/71 |
| 6,714,259 B2 | * | 3/2004 | Kim | 348/706 |
| 2002/0019988 A1 | * | 2/2002 | Shirahama et al. | 725/139 |

* cited by examiner

Primary Examiner—Brian P. Yenke
(74) Attorney, Agent, or Firm—Lerner, David, Littenberg, Krumholz & Mentlik, LLP

(57) ABSTRACT

Viewing of a program at optimum image quality is realized. A correspondence table of combinations of MPEG video encoding parameters and image signal processing parameters is stored in a RAM. A CPU reads out from the RAM an image signal processing parameter corresponding to a combination of MPEG video encoding parameters supplied from a demultiplexer, and on the basis of the image signal processing parameter, controls image signal processing in an image signal processor.

21 Claims, 4 Drawing Sheets

FIG. 3

MPEG VIDEO ENCODING PARAMETER (EXAMPLE)

| | |
|---|---|
| PROFILE/LEVEL DESIGNATION | MP/HL |
| NUMBER OF HORIZONTAL PIXELS | 1920 |
| NUMBER OF VERTICAL PIXELS | 1080 |
| ASPECT CC | 16:9 DISPLAY |
| BIT RATE | 22Mbps |
| FRAME RATE | 30/1,001Hz |
| SCANNING SYSTEM | SEQUENTIAL SCANNING |
| COLOR INITIAL VALUE | PRESCRIBED VALUE OF ITU-R RECOMMENDATION BT.709 |
| CONVERSION CHARACTERISTIC | PRESCRIBED VALUE OF ITU-R RECOMMENDATION BT.709 |
| MATRIX COEFFICIENT | PRESCRIBED VALUE OF ITU-R RECOMMENDATION BT.709 |
| REPEAT FIRST FLAG | FLAG USED AT 2:3 PULL DOWN |

IMAGE PROCESSING APPARATUS, METHOD, AND RECORDING MEDIUM FOR CONTROLLING IMAGE QUALITY

CROSS-REFERENCE TO RELATED APPLICATIONS

The present application claims priority from Japanese Application No. P2000-144410 filed May 17, 2000.

BACKGROUND OF THE INVENTION

The present invention relates to an image processing apparatus, an image processing method, and a recording medium, and particularly to an image processing apparatus, an image processing method, and a recording medium in which the display setting of image quality is automatically changed so that the program of a received television broadcast can be always displayed at optimum image quality.

In recent years, digital broadcasting has begun in earnest. In digital broadcasting, data such as an image or sound is compressed by an MPEG (Motion Picture Experts Group) system or the like and is broadcast.

In digital television broadcasting, since the data is compressed, as compared with analog television broadcasting, a multi-channel and high quality content (program) can be broadcast.

In a conventional television receiver, the function of setting various image qualities is added, and the image quality can be adjusted according to the taste of a user. When many kinds of contents, such as still images and character figures, in addition to normal moving images, come to be broadcast by the development of digital television broadcasting, a more diversified and delicate image quality adjustment is desired.

However, since the setting of image quality in the conventional television receiver is performed by a manual operation while a user confirms a displayed image with the naked eye, delicate setting becomes difficult, and eventually, the user does not adjust the image quality for each program, but usually watches all programs at the same image quality. As a result, there has been a problem that a high-grade function of the television receiver can not be sufficiently exhibited.

SUMMARY OF THE INVENTION

The present invention enables a user to always watch a program at optimum image quality by automatically changing the setting of a screen display in accordance with the program.

An image processing apparatus of the present invention includes an extraction unit operable to extract image data of a selected program, an acquisition unit operable to acquire image encoded information of the selected program, and a setting unit operable to set a signal processing parameter for processing an image signal of the program in accordance with the image encoded information.

The extraction unit may extract the image data of the selected program from a transport stream, and the acquisition unit may acquire the image encoded information of the selected program from service information included in the transport stream.

The image processing apparatus of the present invention can further include a storage device operable to store the signal processing parameter for processing the image signal.

The image processing apparatus of the present invention can further include changing means for changing the signal processing parameter on the basis of an input from a user.

An image processing method of the present invention includes extracting image data of a selected program, acquiring image encoded information of the selected program extracted in the extracting step, and setting a signal processing parameter for processing an image signal of the selected program in accordance with the image encoded information.

A recording medium of the present invention is recorded with a computer readable program for processing images. The program includes extracting image data of a selected program, acquiring image encoded information of the selected program extracted in the extracting step, and setting a signal processing parameter for processing an image signal of the selected program in accordance with the image encoded information.

In the image processing apparatus, the image processing method, and the recording medium according to the present invention, the signal processing parameter for controlling the display of a picture of the program is set in accordance with the image encoded information of the selected program. Accordingly, it becomes possible to watch the program easily at the optimum screen quality without carrying out a complicated operation.

BRIEF DESCRIPTION OF THE DRAWINGS

FIG. 3 is a view showing an example of MPEG video encoding parameters; and

DETAILED DESCRIPTION

Figure 1:
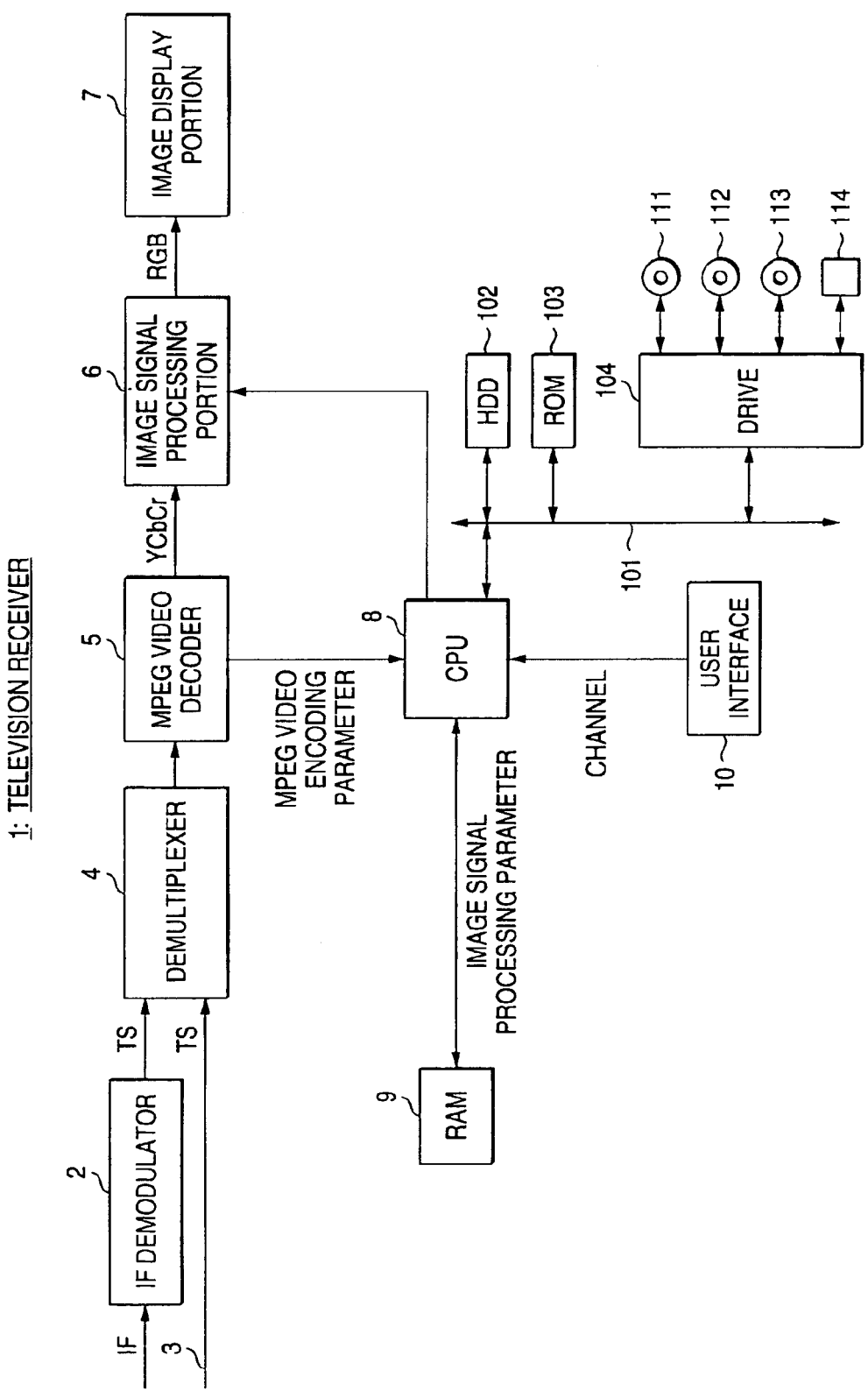
FIG. 1 is a block diagram showing a structural example of a television receiver to which the present invention is applied.

FIG. 1 shows a structural example of a television receiver 1 which receives a digital broadcast transmitted from a not-shown broadcasting station and displays (outputs) an image and sound.

An IF demodulator 2 demodulates an IF (Intermediate Frequency) signal obtained from a digital broadcast wave received by a not-shown antenna and outputs it as a transport stream to a demultiplexer 4.

In addition, a transport stream transmitted from a CATV system, a network system or the like is supplied to the demultiplexer 4 through a transmission path 3.

The demultiplexer 4 separates a TS (transport stream) packet including image data from TS packets constituting the supplied transport stream, and outputs it to an MPEG video decoder 5.

The TS packet holding the image data is decoded in the MPEG video decoder 5, and is output to an image signal processing portion 6. Additionally, MPEG video encoding parameters indicating information relating to the encoding of the TS packet are separated in the MPEG video decoder 5 and are output to a CPU (Central Processing Unit) 8.

The image signal processing portion 6 generates an RGB signal from a decoded luminance signal and color-difference signal, and displays an image on an image display portion 7 including a CRT (Cathode-Ray Tube) or an LCD (Liquid Crystal Display).

The CPU 8 controls respective portions in response to an input from a user interface 10 so as to output a signal corresponding to an operation of a user. Data and programs necessary for the CPU 8 to execute various processes are stored in a RAM 9.

An HDD (Hard Disk Drive) 102, a ROM (Read Only Memory) 103, and a drive 104 are connected to the CPU 8 through a bus 101. As a recording medium, a magnetic disk 111, an optical disk 112, a magneto-optical disk 113, or a semiconductor memory 114 is mounted on the drive 104.

Figure 2:
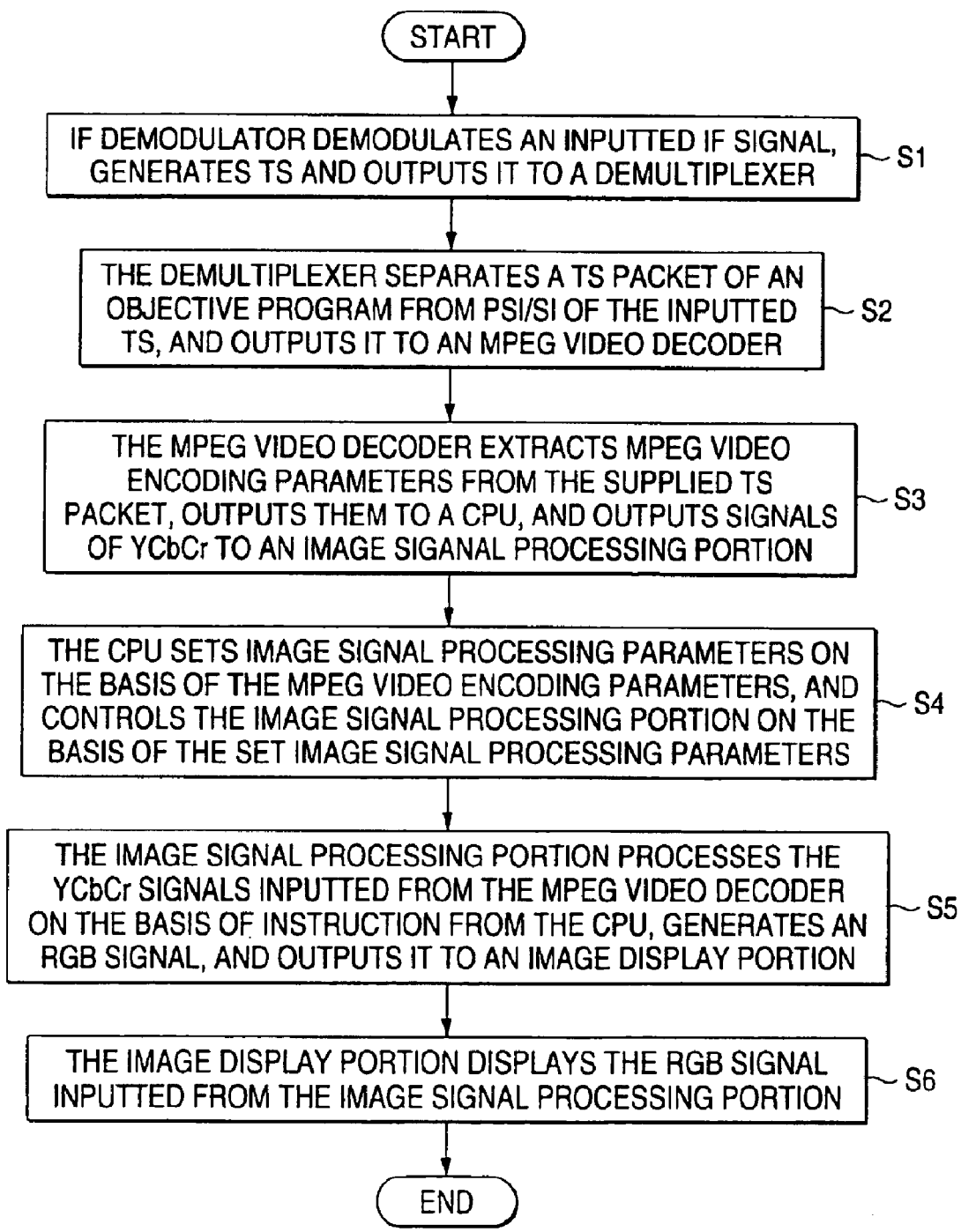
FIG. 2 is a flowchart for explaining the operation of the television receiver of FIG. 1.

Next, the operation of the television receiver 1 of FIG. 1 will be described with reference to the flowchart of FIG. 2.

At step S1, the IF demodulator 2 demodulates an IF signal obtained from a digital broadcast wave received by a not-shown antenna, generates a transport stream, and outputs it to the demultiplexer 4.

At step S2, the demultiplexer 4 separates a TS packet holding video data of an objective program from PSI (Program Specific Information) and SI (Service Information) included in the supplied transport stream, and outputs it to the MPEG video decoder 5. The PSI means specific information of a program (broadcast program) prescribed by the MPEG, and consists of four tables, including a PAT (Program Association Table), a PMT (Program Map Table), a NIT (Network Information Table), and a CAT (Conditional Access Table) and various descriptors. The SI is information which is unique to a broadcasting business.

At step S3, the MPEG video decoder 5 decodes the TS packet including the video data by the MPEG system, generates a luminance signal (Y) and color-difference (Cr, Cb) signals, and outputs them to the image signal processing portion 6. In the present invention, in order to cause the optimum image to be displayed on the image display portion 7, signal processing executed in the image signal processing portion 6 is controlled in accordance with the image signal processing parameters acquired by the CPU 8. Then, the MPEG video decoder 5 extracts the MPEG videos encoding parameters as shown in FIG. 3, which describe information in relation to the encoding of the video data, and outputs them to the CPU 8.

In an example of the MPEG video encoding parameters of FIG. 3, profile/level designation is MP/HL (Main Profile/High Level), the number of horizontal pixels is 1920, the number of vertical lines is 1080, an aspect ratio is 16:9 display, a bit rate is 22 Mbps, a frame rate is 30/1,001 Hz, a scan system is a sequential scanning (progressive scanning) system, a color initial value, a conversion characteristic, and a matrix coefficient are prescribed values of ITU-R recommendation BT. 709, and a repeat first flag is a flag used at 2:3 pull down.

At step S4, the CPU 8 searches and sets image signal processing parameters corresponding to a combination of the MPEG video encoding parameters, which are supplied from the MPEG video decoder 5, from a correspondence table of the MPEG video encoding parameters and the image signal processing parameters which is previously stored in the RAM 9. For example, in the case where the combination of the supplied MPEG video encoding parameters is such that profile/level is MP/HL, the number of display pixels/frame rate is 1920×1080/24 P, and the bit rate is 22 Mbps, the CPU 8 recognizes that the image data of the TS packet extracted from the transport stream is a movie of high image quality, and acquires and sets such image signal processing parameters as to lower the brightness, attenuate the sharpness, lower the color temperature, cut NR (Noise Reduction), cut VM (Velocity Modulation (beam velocity modulation)), and strengthen gamma correction, from the correspondence table of the combination of the MPEG video encoding parameters and the image signal processing parameters stored in the RAM 9. On the basis of these image signal processing parameters, the CPU 8 controls the signal processing in the image signal processing portion 6 so that all of a delicate gradation of a dark portion, a profile, and color can be displayed with a soft touch, and the quality of an original film can be displayed.

At step S5, on the basis of the image signal processing parameters set by the CPU 8, the image signal processing portion 6 processes the luminance signal and the color-difference signals supplied from the MPEG video decoder 5, generates an RGB signal, and outputs it to the image display portion 7.

At step S6, the image display portion 7 displays an image on the basis of the RGB signal supplied from the image signal processing portion 6.

Figure 4:
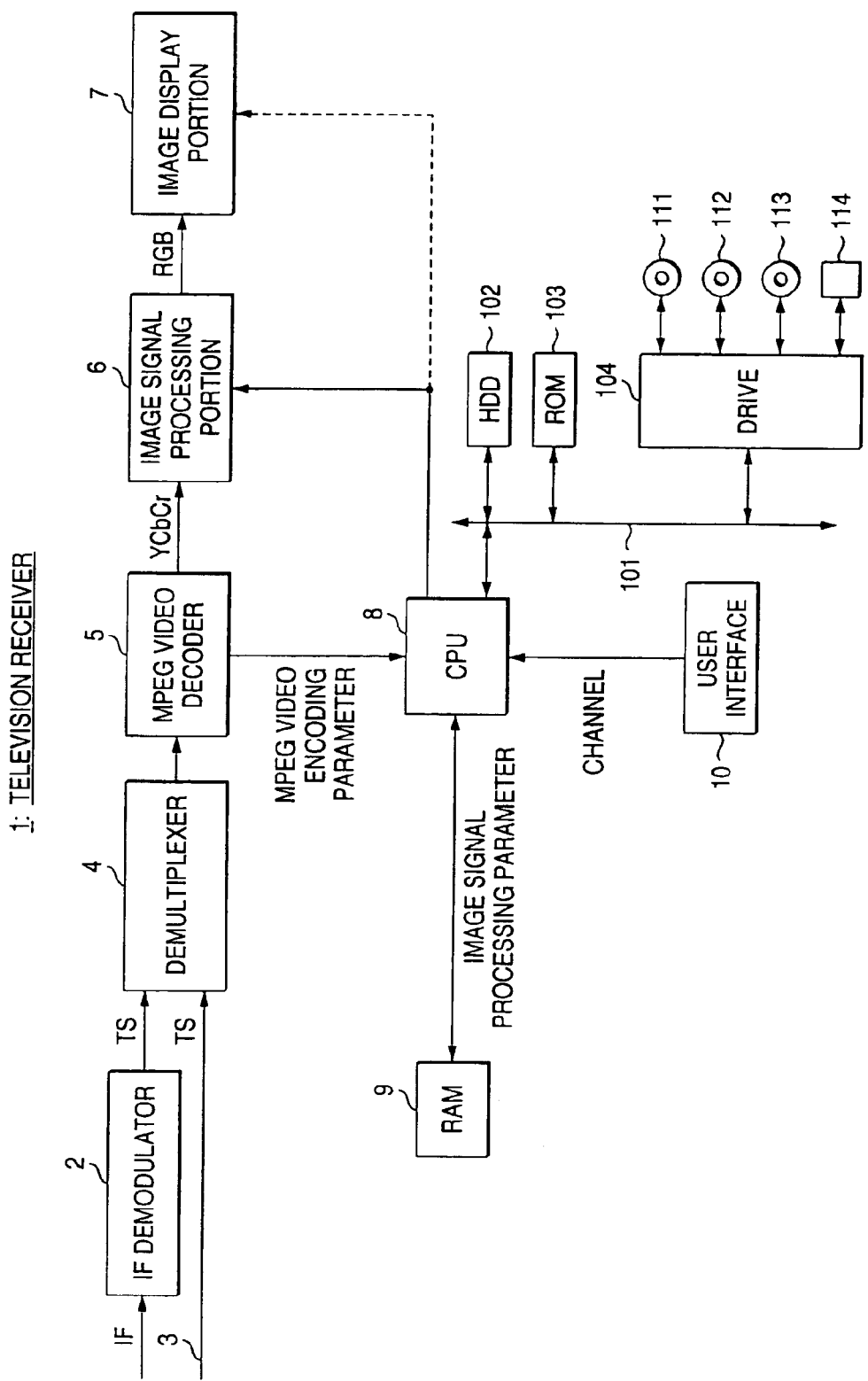
FIG. 4 is a block diagram showing a structural example of another television receiver to which the present invention is applied.

In the above operation, although the signal processing in the image signal processing portion 6 is controlled on the basis of the image processing parameters, it is also possible to further control the image display portion 7, as shown in FIG. 4.

In the present invention, it is also possible to change the setting of the image signal processing parameters for a particular program (series program) according to the taste of the user through operation of the user interface 10. The changed image signal processing parameters for the program are stored in the RAM 9. Thereafter, when the same program is selected by the user, the signal processing in the image signal processing portion 6 and the image display portion 7 are controlled on the basis of the image signal processing parameters stored for that program, and the image is displayed.

The present invention can also be applied to an audio signal. For example, in the case where signal processing as to data of a music program is carried out, with respect to a video signal, the above described image signal processing is carried out and is displayed, and with respect to the audio signal, sound signal processing parameters are set from a combination of MPEG audio encoding parameters, and a sound signal processing portion and a sound output portion can be controlled as well.

Further, in the case where a plurality of images are displayed in a plurality of windows of one screen at the same time, a display (output) may be controlled for each of the images displayed in the respective windows.

Although the description above has been made in the case where the present invention is applied to a television receiver, the present invention can be applied to any devices (for example, a personal computer, etc.) which process digital data, including an IRD (Integrated Receiver/Decoder).

Although the foregoing series of processes can be executed by hardware, they can also be executed by software. In the case where the series of processes are executed by software, a program constituting the software is installed from a recording medium to a computer integrated in dedicated hardware, or, for example, a multi-purpose personal computer which can execute various functions by installing various programs.

As shown in FIG. 1, this recording medium consists not only of a package medium which is separate from a computer and is distributed to the user to provide a program and in which the program is recorded, such as a magnetic disk 111 (including a floppy disk), an optical disk 112 (including a CD-ROM (Compact Disk-Read Only Memory) and a DVD (Digital Versatile Disk)), a magneto-optical disk 113 (including an MD (Mini-Disk)), or a semiconductor memory 114, but also by a ROM 103 or an HDD 102 which is provided to the user in the state in which it is previously integrated in the computer and in which the program is recorded.

Incidentally, in the present specification, steps describing the program recorded in the recording medium naturally include processes carried out in time series along the recited sequence, and also include processes which are not necessarily processed in time series but are executed in parallel or individually.

Besides, in the present specification, the system indicates an entire apparatus constituted by a plurality of devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An image processing apparatus, comprising:
    an extraction unit operable to extract digital image data of a selected program;
    an acquisition unit operable to acquire video encoding parameters associated with the extracted digital image data of the selected program, the video encoding parameters including a color initial value, and to decode the extracted digital image data into decoded image signals including a luminance signal and color difference signals;
    a setting unit operable to set at least one image signal processing parameter in accordance with the video encoding parameters, the at least one image signal processing parameter including a parameter corresponding to the color initial value; and
    a processing unit operable to process the decoded image signals that include the luminance signal and the color difference signals into processed image signals that include RGB signals, the at least one image signal processing parameter that includes the parameter corresponding to the color initial value being used to control the processing of the decoded image signals and thereby control image quality of the selected program.

2. The image processing apparatus according to claim 1, wherein:
    said extraction unit extracts the digital image data of the selected program from a transport stream; and
    said acquisition unit acquires the video encoding parameters from service information included in the transport stream.

3. The image processing apparatus according to claim 1, further comprising a storage device operable to store the at least one image signal processing parameter and to supply the setting unit with the at least one image signal processing parameter in accordance with the video encoding parameters.

4. The image processing apparatus according to claim 1, further comprising a changing unit operable to change the at least one image signal processing parameter on the basis of an input from a user.

5. The image processing apparatus according to claim 4, wherein said storage device is operable to store the changed image signal processing parameter.

6. The image processing apparatus according to claim 1, further comprising a display operable to display the processed image signals.

7. The image processing apparatus according to claim 6, wherein the display of the processed image signals is adjusted in accordance with the video encoding parameters.

8. The image processing apparatus according to claim 1, wherein the video encoding parameters further include parameters selected from the group consisting of profile/level designation, number of horizontal pixels, number of vertical lines, aspect ratio, bit rate, frame rate, conversion characteristic, matrix coefficient, and repeat first flag.

9. The image processing apparatus according to claim 1, wherein said setting unit is operable to set a further image signal processing parameter to control at least one display setting selected from the group consisting of noise reduction, beam velocity, modulation, and gamma correction.

10. An image processing method, comprising:
    extracting digital image data of a selected program;
    acquiring video encoding parameters associated with the extracted digital image data of the selected program, the video encoding parameters including a color initial value;
    decoding the extracted image data into decoded image signals including a luminance signal and color difference signals;
    setting at least one image signal processing parameter in accordance with the video encoding parameters, the at least one image signal processing parameter including a parameter corresponding to the color initial value; and
    processing the decoded image signals that include the luminance signal and the color difference signals into processed image signals that include RGB signals, the at least one image signal processing parameter that includes the parameter corresponding to the color initial value being used to control the processing of the decoded image signals and thereby control image quality of the selected program.

11. The image processing method according to claim 10, wherein:
    said extracting step extracts the digital image data of the selected program from a transport stream; and
    said acquiring step acquires the video encoding parameters from service information included in the transport stream.

12. The image processing method according to claim 10, further comprising storing the at least one image signal processing parameter and supplying the at least one image signal processing parameter in accordance with the video encoding parameters.

13. The image processing method according to claim 10, further comprising changing the at least one image signal processing parameter on the basis of an input from a user.

14. The image processing method according to claim 13, further comprising storing the changed image signal processing parameter.

15. The image processing method according to claim 10, further comprising displaying the processed image signals.

16. The image processing method according to claim 15, wherein said displaying step includes adjusting the processed image signals in accordance with the video encoding parameters.

17. The image processing method according to claim 10, wherein the video encoding parameters further include parameters selected from the group consisting of profile/level designation, number of horizontal pixels, number of vertical lines, aspect ratio, bit rate, frame rate, conversion characteristic, matrix coefficient, and repeat first flag.

18. The image processing method according to claim 10, wherein said setting step sets a further image signal processing parameter to control at least one display setting selected from the group consisting of noise reduction, beam velocity modulation, and gamma correction.

19. A recording medium recorded with a computer readable program for carrying out an image processing method, said method comprising:

extracting digital image data of a selected program;

acquiring video encoding parameters associated with the extracted digital image data of the selected program, the video encoding parameters including a color initial value;

decoding the extracted image data into decoded image signals including a luminance signal and color difference signals;

setting at least one image signal processing parameter in accordance with the video encoding parameters, the at least one image signal processing parameter including a parameter corresponding to the color initial value; and processing the decoded image signals that include the luminance signal and the color difference signals into processed image signals that include RGB signals, the at least one image signal processing parameter that includes the parameter corresponding to the color initial value being used to control the processing of the decoded image signals and thereby control image quality of the selected program.

20. The recording medium according to claim 19, wherein the video encoding parameters further include parameters selected from the group consisting of profile/level designation, number of horizontal pixels, number of vertical lines, aspect ratio, bit rate, frame rate, conversion characteristic, matrix coefficient, and repeat first flag.

21. The recording medium according to claim 19, wherein said setting step sets a further image signal processing parameter to control at least one display setting selected from the group consisting of noise reduction, beam velocity modulation, and gamma correction.

* * * * *

UNITED STATES PATENT AND TRADEMARK OFFICE
CERTIFICATE OF CORRECTION

PATENT NO. : 6,999,129 B2
APPLICATION NO. : 09/855345
DATED : February 14, 2006
INVENTOR(S) : Akira Shirahama, Shinichiro Miyazaki and Hitashi Nakamura It is certified that error appears in the above-identified patent and that said Letters Patent is hereby corrected as shown below:

Column 6, line 17, after "velocity", delete ",".

Signed and Sealed this

Twenty-fifth Day of July, 2006

JON W. DUDAS
*Director of the United States Patent and Trademark Office*